United States Patent [19]

Geibel et al.

[11] Patent Number: 5,235,032

[45] Date of Patent: Aug. 10, 1993

[54] PROCESS FOR THE PREPARATION OF POLY(ARYLENE SULFIDE) WITH LOW METAL CONTAMINATION

[75] Inventors: Jon F. Geibel; Harold D. Yelton, both of Bartlesville, Okla.

[73] Assignee: Phillips Petroleum Company, Bartlesville, Okla.

[21] Appl. No.: 810,653

[22] Filed: Dec. 19, 1991

[51] Int. Cl.$^5$ .............................................. C08G 75/14
[52] U.S. Cl. ...................................... 528/388; 525/537
[58] Field of Search ......................... 528/388; 525/537

[56] References Cited

U.S. PATENT DOCUMENTS

| | | | |
|---|---|---|---|
| 3,919,177 | 11/1975 | Campbell | 260/79.1 |
| 4,116,947 | 9/1978 | Edmonds, Jr. et al. | 528/388 |
| 4,645,826 | 2/1987 | Iizuka et al. | 528/388 |
| 4,659,789 | 4/1987 | Katto et al. | 525/537 |
| 4,699,975 | 10/1987 | Katto et al. | 525/537 |
| 4,745,167 | 5/1988 | Iizuka et al. | 528/388 |
| 4,812,539 | 3/1989 | Iizuka et al. | 528/388 |
| 4,880,901 | 11/1989 | Cleary | 528/388 |

FOREIGN PATENT DOCUMENTS 0226998 12/1986 European Pat. Off. .
2163444A 7/1985 United Kingdom .

OTHER PUBLICATIONS

J. Electrochem. Soc.: Electrochemical Science, vol. 116, No. 2, Feb. 1969, pp. 173-177 "Mechanism of Inhibiting Stress Corrosion Cracking of 18-8 Stainless Steel in $MgCl_2$ by Acetates and Nitrates" H. H. Uhlig and E. W. Cook, Jr.
Corrosion-Nace, vol. 27, No. 6, Jun. 1971, pp. 223-233, "Review of Literature on Pitting Corrosion Published Since 1960" Z. Sklarska-Smiabwska.

Primary Examiner—John C. Bleutge
Assistant Examiner—Helen F. Lee
Attorney, Agent, or Firm—Marianne H. Michel

[57] ABSTRACT

Poly(arylene sulfide) with reduced metal contamination is produced in a two step process by contacting a dihaloaromatic compound, a sulphur source, an organic amide, alkali metal carboxylate and water in a reaction vessel wherein at least the liquid contacting parts of the vessel are constructed of titanium.

6 Claims, No Drawings

PROCESS FOR THE PREPARATION OF POLY(ARYLENE SULFIDE) WITH LOW METAL CONTAMINATION

BACKGROUND OF THE INVENTION

Poly(arylene sulfide)s have become commercially important resins. The products prepared therefrom are finding increasing utility because of their outstanding durability, toughness, chemical inertness, high temperature resistance, and versatility.

In addition, industries such as the electronics industry and the magnetic storage industry require an exceptionally clean polymer, containing very low metal impurities. The use of titanium reactors to reduce metal contamination to moderately low amounts in poly(arylene sulfide) is taught by GB 2,163,444. Although metal contamination is reduced in this manner, appreciable amounts of metals remain in the produced polymer.

SUMMARY OF THE INVENTION

It is an object of this invention to provide a process for preparing a poly(arylene sulfide) having a very low metal contamination when produced in a titanium reactor.

It is another object of the invention to provide a poly(arylene sulfide) with very low metal contamination.

According to the invention, a process for preparing poly(arylene sulfide) with very low metal contamination is provided, which comprises contacting at least one dihaloaromatic compound, at least one organic amide, at least one sulfur-containing compound, at least one alkali metal carboxylate, and water in a titanium vessel, reacting under conditions to produce a prepolymer, and thereafter reacting at an increased temperature to produce a polymer of high molecular weight.

DETAILED DESCRIPTION OF THE INVENTION

This invention relates to a process for preparing poly(arylene sulfide) having very low metal contamination comprising contacting: (a) at least one dihaloaromatic compound, (b) at least one organic amide, (c) at least one sulfur-containing compound, (d) at least one alkali metal carboxylate, and (e) water in a titanium reactor. A polymer with very low metal contamination is produced by the addition of alkali metal carboxylate in a titanium reactor using a two step process.

Reactants

Dihaloaromatic Compound

Dihaloaramatic compounds which can be employed in the process of this invention can be represented by the formula:

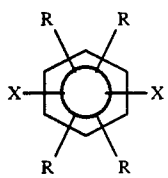

wherein each X is selected from the group consisting of chlorine, bromine, and iodine, and each R' is selected independently from the group consisting of hydrogen and hydrocarbyl in which the hydrocarbyl can be alkyl, cycloalkyl, and aryl radical or combination thereof such as alkaryl, aralkyl, and the like, the total number of carbon atoms in each molecule being within the range of 6 to about 24. While the halogen atoms can be in any position in the dihaloaromatic compound, it is preferred to employ p-dihalobenzenes as the dihaloaromatic compound.

Examples of some dihaloaromatic compounds which can be employed in the process of this invention include p-dichlorobenzene, p-dibromobenzene, p-diiodobenzene, 1-bromo-4-chlorobenzene, 1-chloro-4-iodobenzene, 1-bromo-4-iodobenzene, 2,5-dichlorotoluene, 2,5-dichloro-p-xylene, m-dichlorobenzene, 1-ethyl-4-isopropyl-2,5-dibromobenzene, 1,2,4,5-tetramethyl-3,6-dichlorobenzene, 1,4-dichloro-2-methoxybenzene, 1-butyl-4-cyclohexyl-2,5-dibromobenzene, 1-hexyl-3-dodecyl-2,5-dichlorobenzene, 2-octadecyl-1,4-diiodobenzene, 4-bromo-1-chloro-5-phenylbenzene, 1,4-dibromo-2-(p-tolyl)benzene, 2-benzyl-1,4-dichlorobenzene, 3,5-dichlorobenzoic acid, 1-octyl-4-(3-methylcyclopentyl)-2,5-dichlorobenzene, 1,4-dichloronapthalene, 4,4'-dichlorobiphenyl, 4,4'-dichlorodiphenyl ether, 4,4'-dichlorodiphenyl sulfone, 4,4'-dichorodiphenyl sulfoxide, 4,4'-dichlorobenzophenone, and the like, and mixtures thereof. The preferred dihaloaromatic compound for use in this invention is p-dichlorobenzene due to availability and effectiveness.

Generally, in the preparation of poly-(arlylene sulfide) polymers, the amount of dihaloaromatic compounds employed is in the range of 0.7 to 2 gram-moles per gram-mole of sulfur-containing compound and preferably from about 0.9 to about 1.3. When lesser amounts of dihaloaromatic compounds are used relative to the amount of sulfur-containing compound, a sulfur-rich reaction mixture results.

Sulfur Source

Any suitable sulfur source can be employed in the process of this invention. Suitable sulfur sources are disclosed in U.S. Pat. No. 3,919,177, which is hereby incorporated by reference. Such suitable sulfur-containing compounds include but are not limited to thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides and hydrogen sulfide. It is presently preferred to use an alkali metal sulfide as the sulfur source.

Suitable alkali metal sulfides include lithium sulfide, sodium sulfide, potassium sulfide, rubidium sulfide, cesium sulfide, and mixtures thereof. Preferably the alkali metal sulfide is used as a hydrate or as an aqueous mixture. If desired, the alkali metal sulfide can be prepared as an aqueous solution by the reaction of an alkali metal hydroxide with an alkali metal bisulfide. It is preferred to use sodium sulfide or a combination of sodium bisulfide and sodium hydroxide as the sulfur source in this invention.

Suitable alkali metal bisulfides include lithium bisulfide, sodium bisulfide, potassium bisulfide, rubidium bisulfide, cesium bisulfide, and mixtures thereof. The preferred alkali metal bisulfide due to effectiveness and availability is sodium bisulfide (NaSH).

Although the addition of base is not required when alkali metal bisulfides are used, it is preferable to do so. Bases which can be employed include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate and mixtures thereof. If desired, the hydroxide can be produced in situ by the reaction of the corresponding oxide with water. The preferred alkali metal hydroxide due to effectiveness and availability is sodium hydroxide (NaOH).

If a base is used, the gram-mole of base per gram-mole of alkali metal bisulfide will be in an amount within the range of from about 0.3 to about 4.0 and preferably from about 0.4 to about 2.

Polar Organic compounds

The polar organic compounds useful in the present invention are solvents for the dihaloaromatic compounds and provide the reaction medium for reaction with the sulfur source used in the production of poly(arylene sulfide) polymers. Examples of such polar organic compounds include amides, including lactams, and sulfones. Specific examples of such polar organic compounds include hexamethylphosphoramide, tetramethylurea, N,N'-ethylenedipyrrolidone, N-methyl-2-pyrrolidone (NMP), N-ethylpropionamide, N,N-dipropylbutyramide, pyrrolidone, caprolactam, N-ethylcaprolactam, sulfolane, N,N'-dimethylacetamide, 1,3-dimethyl-2-imidazolidione, low molecular weight polyamides, and the like and mixtures thereof. N-methyl-2-pyrrolidone (NMP) is especially preferred because of excellent results and ready availability.

The gram-moles of organic amide per gram-mole of sulfur source can vary broadly from about 1.5:1 to 24:1, preferably from about 2.5:1 to 16:1, and most preferably from 3:1 to 12:1.

It is preferred that the poly(arylene sulfide) polymer be a homopolymer. However, it is within the scope of this invention to employ copolymers.

Alkali Metal Carboxylate

Alkali metal carboxylates which can be employed in the process of this invention can be represented by the formula $RCO_2M$ where R is a hydrocarbyl radical selected from alkyl, cycloalkyl, and aryl and combinations thereof such as alkylaryl, arylalkyl, said hydrocarbyl radical having 1 to about 20 carbon atoms and M is an alkali metal selected from the group consisting of lithium, sodium, potassium, rubidium, cesium, and mixtures thereof. Preferably, R is an alkyl radical having 1 to about 6 carbon atoms, or a phenyl radical, and M is lithium or sodium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate, and the like, and mixtures thereof. If desired the carboxylate can be prepared in situ by the reaction of the corresponding carboxylic acid with at least one alkali metal hydroxide. The presently preferred alkali metal carboxylate is sodium acetate because of its effectiveness and commercial availability.

The alkali metal carboxylate should be present in an amount sufficient to produce poly(arylene sulfide) with very low metal contamination in a titanium reactor. The gram-moles of alkali metal carboxylate per gram-mole of sulfur source should be within the range of from about 0.05 to about 4, preferably from about 0.1 to about 2, and most preferably from about 0.15 to about 1.5.

Reaction Conditions

The polymerization of the present invention is carried out in at least two stages, which are different with respect to the reaction temperature of the polymerization mixture and, in some embodiments the amount of water present in the polymerization mixture. The product of the first step is a prepolymer of low to medium molecular weight. The second step results in a polymer of high molecular weight. By "high molecular weight" is meant a molecular weight that is higher than the prepolymer.

In the first step of the polymerization, the reaction is carried out at a temperature sufficient to produce a prepolymer of low to intermediate molecular weight, generally from about 160° to 240° C., preferably from about 180° to 230° C., and most preferably from about 190° to 220° C. At temperatures less than 160° C., the reaction is too slow.

The reaction mixture contains water in the amount sufficient to produce a prepolymer of low to intermediate molecular weight, generally about 0.5 to 10 gram-mole of sulfur source. The amount of water present can be adjusted by carrying out a dehydration step before the reaction. Preferably the water content is 2.4 to 6 gram-moles per gram-mole of sulfur source.

The sulfur source and dihaloaromatic compound are added to the organic amide solvent in an atmosphere of inert gas. The temperature is elevated to advance the reaction for a time sufficient to produce a prepolymer of low to intermediate molecular weight. The first stage is complete when at least 50 mole % of the dihaloaromatic compound is polymerized. The time required is generally from 1 to 20 hours, preferably from 5 to 15 hours.

In the second step of the polymerization the temperature is sufficient to produce a polymer of high molecular weight, generally from about 245° to 290° C., preferably the temperature is maintained at 250°–280° C., and most preferably 250°–270° C. Below 245° C. a poly(arylene sulfide) with low melt viscosity is obtained. If the temperature exceeds 290° C., there is the possibility that the poly(arylene sulfide) formed will decompose.

The amount of water generally used in the second step is the amount sufficient to produce a polymer of high molecular weight at the increased temperatures described above. That amount may be the same as the first step, or additional water may be added. It is preferable that the water content be about 2.5 to 7.0 gram-moles per gram-mole of the sulfur source charged. It is most preferred that the water content be 3.5 to 5.0 gram-moles per gram-mole of the sulfur source. If the water content is over 7.0 gram-moles, the melt viscosity of the poly(arylene sulfide) will be lowered.

The time required for the second step is that which is sufficient to produce a polymer of high molecular weight. It is generally from 1 to 50 hours, preferably from 1 to 20 hours, and most preferably from 5 to 15 hours. If the reaction time of the second step is too short, the condensation polymerization will be insufficient, resulting in a poly(arylene sulfide) with low viscosity. If the reaction time is too long, decomposition may occur.

The poly(arylene sulfide) polymers can be separated from their reaction mixture by conventional procedures, e.g. by filtration of the polymer. The polymer can then be washed with water and optionally water-miscible solvents such as acetone, methanol, or more organic amide in order to remove impurities and by-product salts.

The arylene sulfide polymers can be blended with fillers, pigments, extenders, other polymers, and the like. The polymers can be cured through crosslinking and/or chain extension, e.g., by heating at temperatures up to about 480° C. in the presence of a free oxygen-containing gas, to provide cured products having high thermal stability and good chemical resistance. They are useful in the production of coatings, films, molded objects, and fibers.

While this invention has been described in detail for the purpose of illustration it is not be construed as limited thereby, but is intended to cover all changes and modifications within the spirit and scope thereof.

EXAMPLES

In the following examples, the polyphenylene sulfide (PPS) melt flow values were determined by the method ASTM D 1238-86, Condition 316/5.0, modified to use a preheat time of five minutes. Melt flow values are reported in units of grams per ten minutes (g/10 min).

Metals analyses in PPS polymers were performed by inductively coupled plasma-mass spectroscopy on aqueous nitric acid digestion products of the residual ash remaining from pyrolysis of the polymers. Metal concentrations are reported in parts per million (ppm). The designation BDL is used when metals are below the detection limits of the instrument.

EXAMPLE I

This example is a control polymerization performed in a titanium autoclave without an added carboxylate salt.

A one-liter, titanium autoclave equipped with an anchor stirrer was charged with 1.0 g-mol sodium hydrosulfide (NaSH) as an aqueous mixture containing 60.218 wt % NaSH, 1.03 g-mol sodium hydroxide (NaSH), and 4.54 g-mol N-methyl-2-pyrrolidone (NMP). The autoclave was closed, purged with nitrogen while stirring, and heated for dehydration. When the temperature reached 162° C. of the reaction mixture, the dehydration vent line was opened and dehydration was carried out under a slow purge of nitrogen for 30 minutes to a final temperature of 210° C. The dehydration operation removed 53 mL of liquid.

After termination of the dehydration step, 1.01 g-mol of p-dichlorobenzene (DCB) was charged to the autoclave with 0.76 g-mol of NMP. The mixture was heated to 210° C. and held at that temperature for 10 hours. At the conclusion of this step, the autoclave was cooled and left overnight.

The next day, 4.0 g-mol distilled water were charged to the autoclave and the mixture was heated to 260° C. and held at that temperature for 10 hours. After the autoclave had been cooled and opened, the contents were mixed with water and removed from the autoclave. This mixture was blended in a blended and sieved on a 200 mesh screen. The solid product was washed in hot deionized water with stirring to remove residual polar organic compound and water soluble by-products. After the solid had been dried in a vacuum oven at 125° C., the product (polymer 1) had a melt flow of 274 g/10 min. Metals analysis revealed that polymer 1 contained 4.8 ppm iron (Fe) and 8.2 ppm titanium (Ti).

EXAMPLE II

Polymerization run 2 was carried out to demonstrate the invention feature of added sodium acetate to reduce the metal content of PPS made in a titanium autoclave. The same apparatus and essentially the same procedure as in Example I were used except for the changes noted here. With the original mixture of NaSH, NaOH, and NMP was charged 0.32 g-mol of sodium acetate (NaOAc). The dehydration step removed 45 mL of liquid. When the polymerization autoclave was opened, some large polymer particles were present with a larger portion of smaller particles of polymer. The larger particles were collected and washed separately. Melt flow values were determined on both the large particles and the bulk polymer.

The results of this polymerization are summarized in Table I. Included in the table for comparison are the corresponding results for polymer 1 from Example I. Polymer 2, made with sodium acetate, had less iron and titanium than comparative polymer 1 with both particle size components of polymer 2 showing no significant change in melt flow relative to that of polymer 1. There were also reductions in the amounts of nickel (Ni), copper (Cu), and zinc (Zn) in polymer 2 compared with polymer 1. This shows that in accordance with the invention it is possible to produce polymer with iron, nickel, and zinc contamination of less than 3 ppm each.

TABLE I

| | | | PPS Polymerizations[a] | | | | | |
|---|---|---|---|---|---|---|---|---|
| Polymer | Acetate Present | Melt Flow, g/10 min | Metals, ppm | | | | | |
| | | | Cr | Fe | Ni | Ti | Cu | Zn |
| 1 | no | 274 | BDL[b] | 4.8 | 2.5 | 8.2 | 6.6 | 4.3 |
| 2 | yes | 333 228[c] | BDL[b] | 1.3 | 0.73 | 0.75 | 2.5 | 2.1 |

[a]In a titanium autoclave.
[b]BDL = below detection limits.
[c]Large particles.

EXAMPLE III

This example demonstrates the lack of influence of sodium acetate on the trace metal contents of polymers produced in a stainless steel autoclave. Two polymerizations were carried out as described in Example I except for the use of a 316 stainless steel autoclave instead of the titanium autoclave. Run 3 is a comparative run made without any added sodium acetate. Run 4 is a run made with 0.32 g-mol added sodium acetate. The amounts of liquid removed during the dehydration step in run 3 was 64 mL and in run 4 was 66 mL.

The results of these two runs (Table II) show that the presence of sodium acetate during the PPS polymerization in a stainless steel autoclave (run 4) does not change the metals contents significantly compared with a similar polymerization without sodium acetate (run 3). Polymer from run 4 had a slight increase in melt flow compared with polymer from run 3.

TABLE II

| | | PPS Polymerizations[a] | | | | | | |
|---|---|---|---|---|---|---|---|---|
| | | Melt | | | | | | |
| | Ace- | Flow, | | | | | | |
| Poly- | tate | g/10 | | | Metals, ppm | | | |
| mer | Present | min | Cr | Fe | Ni | Ti | Cu | Zn |
| 3 | no | 128 | 7.3 | 36 | 22 | BDL[b] | 7.3 | 3.1 |
| 4 | yes | 196 | 7.6 | 29 | 26 | BDL[b] | 7.0 | 4.1 |

[a] In 316 stainless steel autoclave.
[b] BDL = below detection limits.

EXAMPLE IV

Two more PPS polymerizations were done to further demonstrate the advantage of the use of a sodium carboxylate in a titanium autoclave to reduce the metals content of PPS. Both runs were carried out essentially as described in Example I. Run 5 was done without any added sodium acetate and Run 6 was done with 0.32 g-mol added sodium acetate. The dehydration step removed 47 mL of liquid in both polymerizations.

As shown in Table III, polymerization run 6, made with sodium acetate, produced a polymer with lower levels of metals, especially titanium, than polymer 5, which was made without the added acetate salt. The melt flow of polymer 6 was slightly higher than that of polymer 5.

TABLE III

| | | PPS Polymerizations[a] | | | | | | |
|---|---|---|---|---|---|---|---|---|
| | | Flow | | | | | | |
| | Ace- | Rate, | | | | | | |
| Poly- | tate | g/10 | | | Metals, ppm | | | |
| mer | Present | min | Cr | Fe | Ni | Ti | Cu | Zn |
| 5 | no | 229 | BDL[b] | 3.5 | 2.5 | 15 | 18 | 8.5 |
| 6 | yes | 289 | BDL[b] | 0.37 | 2.3 | 0.6 | 12 | 2.7 |

[a] A titanium autoclave.
[b] BDL = below detection limits.

That which is claimed is:

1. A process for the production of poly(arylene sulfide) with reduced metal contamination comprising:
   contacting the following compounds in a vessel wherein the liquid contacting parts thereof are constructed of titanium;
   (a) a p-dihaloaromatic compound;
   (b) a sulfur-containing compound selected form the group consisting of alkali metal sulfide, alkali metal bisulfide and hydrogen sulfide; providing further when said sulfur-containing compound is said alkali metal bisulfide or hydrogen sulfide, a base is also present;
   (c) an organic amide selected from the group consisting of cyclic and acyclic amides having 1 to about 10 carbon atoms per molecule;
   (d) an alkali metal acetate, and
   (e) water to form a mixture; and maintaining at least a portion of said mixture at polymerization conditions comprising the following two steps;
      (1) reacting said mixture at a temperature of 180° to 230° C. in the presence of 0.5 to 10 gram-moles of water per gram-mole of sulfur containing compound for about 1 to about 20 hours, and thereafter
      (2) increasing the temperature to 250° to 280° C. in the presence of 2.5 to 7 gram-moles of water per gram-mole of sulfur containing compound for about 1 to 20 hours.

2. A process according to claim 1 wherein the gram-moles of said p-dihaloaromatic compound per gram mole of said sulfur source is about 0.9 to about 1.3;
   the gram-moles of said organic amide per gram-mole of said sulfur source is about 4 to about 16; and
   the gram-moles of said alkali metal acetate per gram-mole of said sulfur source is about 0.1 to about 2.

3. A process for the production of poly(phenylene sulfide) comprising:
   contacting the following compounds in a vessel wherein the liquid contacting parts thereof are constructed of titanium:
   (a) p-dichlorobenzene,
   (b) sodium bisulfide,
   (c) sodium hydroxide
   (d) N-methyl-2-pyrrolidone,
   (e) sodium acetate, and
   (f) water to form a mixture; and
      (1) heating said mixture at a temperature of 190° to 220° C. in the presence of 2.4 to 6 gram-moles of water per gram-mole of said alkali metal bisulfide, for about 5 to 15 hours, and thereafter
      (2) increasing the temperature of said mixture to 250° to 270° C. in the presence of 3.5 to 5 gram-moles of water for about 5 to 15 hours;
   wherein the gram-moles of said p-dichlorobenzene per gram-mole of said sodium bisulfide is about 0.9 to about 1.3;
   the gram-moles of said sodium hydroxide per gram-mole of sodium bisulfide is about 0.4 to about 2;
   the gram-moles of said N-methyl-2-pyrrolidone per gram-mole of said sodium bisulfide is about 4 to about 12; and
   the gram-moles of said sodium acetate per gram-mole of said sodium bisulfide is about 0.1 to about 2.

4. A process according to claim 3 wherein said sodium hydroxide, said sodium bisulfide, said sodium acetate, and said N-methyl-2-pyrrolidone are contacted prior to contacting with p-dichlorobenzene.

5. A solid product produced by the process of claim 4.

6. A process according to claim 1 wherein said sulfur source is an alkali metal bisulfide.

* * * * *